United States Patent
Bliss et al.

[11] 3,867,017
[45] Feb. 18, 1975

[54] APODISED APERTURE ASSEMBLY FOR HIGH POWER LASERS

[75] Inventors: Erlan S. Bliss, Dublin; David Ralph Speck, Alamo, both of Calif.

[73] Assignee: The United States of America as represented by the Atomic Energy Commission, Washington, D.C.

[22] Filed: Nov. 27, 1973

[21] Appl. No.: 419,315

[52] U.S. Cl............... 350/205, 350/179, 350/206
[51] Int. Cl........................ G02b 9/00, G02b 9/08
[58] Field of Search................. 350/205, 206, 179

[56] References Cited
UNITED STATES PATENTS

| | | | |
|---|---|---|---|
| 2,182,499 | 12/1939 | Ott | 350/205 X |
| 2,481,660 | 9/1949 | Harrison | 350/206 X |
| 2,611,294 | 9/1952 | Luboshez | 350/205 |
| 3,634,219 | 1/1972 | Sinai | 350/205 |

FOREIGN PATENTS OR APPLICATIONS

| | | | |
|---|---|---|---|
| 982,520 | 2/1965 | Great Britain | 350/205 |

OTHER PUBLICATIONS

"Absorption Lens for Producing Uniform Laser Beams," Applied Optics, Vol. 11, No. 3, March 1972, pp. 694–695, CBS Laboratories.
"Use of Absorbing Glass in Len Systems," by Argyle Applied Optics, Vol. 10, No. 4, April 1971, pp. 970–972.

*Primary Examiner*—Alfred E. Smith
*Assistant Examiner*—Saxfield Chatmon, Jr.
*Attorney, Agent, or Firm*—John A. Horan; Frederick A. Robertson; L. E. Carnanhan

[57] ABSTRACT

An apodised aperture assembly using absorbing liquid or solid to vary transmission over the cross section thereof is used to minimize deleterious diffraction effects in high power lasers. By employing, for example, an absorbing liquid of varying optical density to obtain the transmission profile, a circular aperture of this type can be used to minimize diffraction effects, thereby substantially improving the performance of a high power laser system.

5 Claims, 1 Drawing Figure

PORTS FOR LIQUID ABSORBER

PATENTED FEB 18 1975 3,867,017
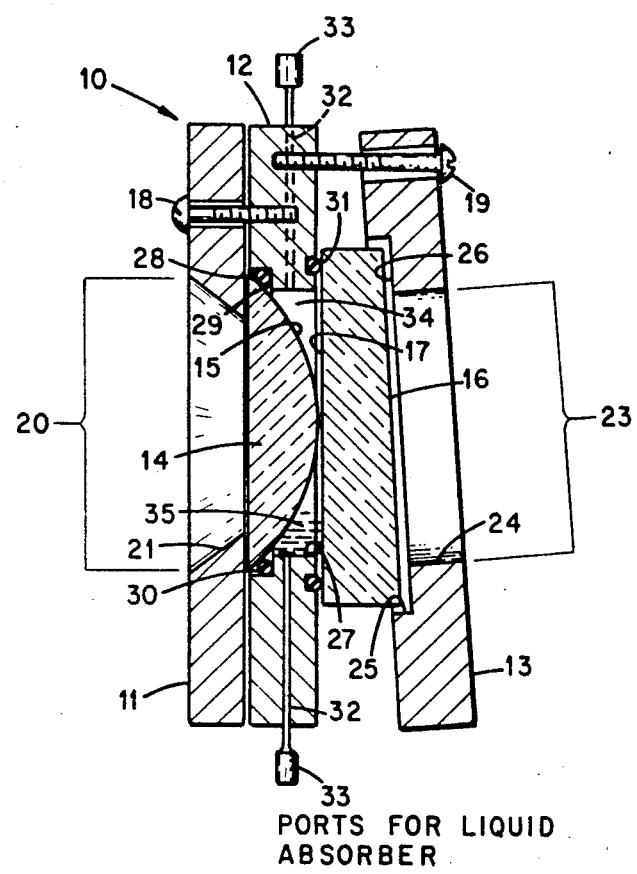
PORTS FOR LIQUID ABSORBER

APODISED APERTURE ASSEMBLY FOR HIGH POWER LASERS

BACKGROUND OF THE INVENTION

The invention described herein was made in the course of, or under, Contract No. W—7405—ENG—48 with the United States Atomic Energy Commission.

This invention relates generally to optical elements, and particularly to an apodised aperture assembly with a transmission which varies over the cross section thereof, and more particularly to an apodised aperture which utilizes an absorbing liquid or solid of varying optical density for minimizing deleterious diffraction effects in high power lasers.

When a laser beam is truncated by passing it through a circular aperture, diffraction rings are generated in the intensity profile. In many cases these rings are undesirable, yet any large laser system necessarily contains a number of finite size apertures. Diffraction effects are less severe if the aperture exhibits a gradual change in transmission from 100 percent to 0 percent over a range of radius. Altering the pupil function of an aperture in this way is called apodisation, and such techniques are used in spectroscopy and astronomy, as exemplified by the article by B. Dossier, Rev. d'Optique 33, pp. 57, 147 and 267 (1954); the article entitled "Apodisation" in Progress in Optics III, by P. Jacquinot, edited by E. Wolf, North-Holland Publishing Co., Amsterdam (1964) and in "Principles of Optics" by Born and Wolf, 4th Ed., Pergamon Press (1970), page 416. Thus, a need has existed for an effective yet structurally simple means to minimize deleterious diffraction effects in high power laser beams when passed through a circular aperture.

SUMMARY OF THE INVENTION

This invention is a means for overcoming deleterious diffraction effects when a high power laser beam is passed through a circular aperture, and thus comprises an apodised aperture having a transmission which varies over the cross section. The invention constitutes an optical element defining an apodised aperture assembly which employs an absorbing liquid or solid of varying optical density to obtain the desired transmission profile, whereby the deleterious diffraction effects in high power laser beans are minimized when passed through a circular aperture.

BRIEF DESCRIPTION OF THE DRAWING

The single figure is a cross-sectional view of an apodised aperture assembly made in accordance with the invention.

DESCRIPTION OF THE INVENTION

This invention constitutes an apodised aperture assembly which is an optical element with a transmission which varies over the cross section thereof.

Diffraction caused by apertures in high power laser systems results in highly nonuniform energy distribution in the laser beam. Ideally, a smoothly varying distribution of the energy with radius is desired, as pointed out above. One of the deleterious effects of diffraction fungus is early self-focusing damage, which has been observed in Nd glass lasers.

It has been found that a simple way of minimizing diffraction effects is to introduce a gradual decrease of transmission with radius — starting with a maximum at 0 radius and decreasing to a minimum at the maximum radius of a circular aperture, which process is called apodisation with such a compensated aperture being termed an apodised aperture assembly or apodiser.

Broadly, the hereinafter described embodiment utilizes a layer of absorbing liquid whose thickness is near zero in the center and increases with increasing radius providing a smoothly varying transmission profile. Ideally the indices of refraction of the liquid and the windows of the assembly that holds the liquid are equal so that the aperture has no optical power and no internal reflections. However, optical neutrality is not always necessary and in any case can be obtained even for unmatched indices by grinding a corrective curvature on the outside surface of either window.

Referring now to the drawing, the illustrated embodiment comprises a holder or support assembly constructed of aluminum, for example, generally indicated at 10 composed of three sections 11, 12 and 13 securing therein an optical assembly composed of a window or lens 14 having a curved inner surface 15, constructed of crown glass, for example, and an optical element or window 16, constructed of crown glass, for example, having a flat inner surface 17, outer holder sections 11 and 13 being secured to central section 12 by removable securing means such as screws 18 and 19, respectively, threaded into central section 12. The diameters of windows 14 and 16, for example, are 20 mm and 25 mm with a thickness of about 5 mm. Holder section 11 is provided with a central aperture 20 having a diameter, for example, of 10 mm, and having an inwardly tapering surface 21, the inner diameter thereof being less than the diameter of lens 14. Holder section 13 is provided with a central aperture generally indicated at 23 and composed of two portions 24 and 25 of different diameters of 18 mm and 25 mm, for example, defining a shoulder 26, optical element 16 being retained within aperture portion 25 and in abutment with shoulder 26 about the periphery thereof. Central holder section 12 is provided with a central aperture also composed of two adjoining different diameter portions 27 and 28 defining therebetween a shoulder 29. An O-ring seal 30 or other appropriate seal is positioned on shoulder 29 and abuts against the outer curved surface 15 of lens 14 such that lens 14 is essentially located within aperture portions 27 and 28 of central holder section 12, being secured therein by holder section 11. Central holder section 13 is provided with a groove containing an O-ring seal 31 which abuts against the flat surface 17 of optical element 16 and secured thereagainst by holder section 13 forming a seal therebetween. A plurality of passages 32 (two shown in this embodiment) extends radially outward from central aperture portion 27 of holder section 12 and are connected to a plurality of ports 33 which are connected to a supply of liquid absorber, not shown, but indicated by legend, whereby an area of central aperture portions 27 and 28 and an area between optical element surfaces 15 and 17, as defined by seals 30 and 31, constitutes a chamber 34 containing absorbing liquid 35, such as a saturable dye, which functions to absorb a portion of the incident radiation. The amount of energy absorbed increases as the thickness of the absorbing layer increases. For a linear absorber the fraction of energy transmitted decreases exponentially with increasing absorber thickness. For a saturable absorber and high enough laser intensities the amount of energy absorbed is directly proportional to the absorber thickness and independent of the radiation intensity. As seen in the drawing, chamber 34 is of increasingly larger thickness from the central point thereof to the outer periphery thereof, such that the thickness of the absorbing liquid 35 is near zero in the center and increases with increasing radius, providing a smoothly varying transmission profile when a high power laser beam is passed therethrough. In the embodiment shown, lens or window 14 provides the radial variation of thickness while optical element or window 16 provides a flat surface regardless of the position of window 16 within holder section 13. However, in the more general case optical elements 14 and 16 may both have curved inner surfaces. As pointed out above, optical neutrality may be desired and can be obtained by the indices of refraction of the windows and liquid being equal or by grinding a corrective curvature on the outside surface of either window.

The absorbing liquid 35 may be a linear absorber or a saturable absorber. For a particular choice of surface curvatures, a variety of transmission profiles can be obtained by using different concentrations of these two classes of absorbers. In addition the liquid 35 may be circulated for cooling into high repetition rate systems, or for removing liquid whose absorbing properties may have changed due to age or exposure to the radiation present in the laser system. In the most general case, the surfaces need not be spherical or even cylindrically symmetric, since they are determined by the transmission profile desired. Also, the variable thickness absorber need not be liquid but can be absorbing glass, for example, with its optical power being negated as desired by a properly figured lens of nonabsorbing glass or by immersing it in an index matching fluid.

A design of the apodised aperture which has been tested utilized a chamber (chamber 34), containing the absorbing liquid, having 0.1 mm thickness at the center and opening up to 2.0 mm at the outer edge, accomplished with a plano convex lens (window 14) and a plane plate (window 16). The chamber was filled with a Kodak 9740 dye dissolved in chlorobenzene, which exhibits an absorption coefficient of $\approx 25$ cm$^{-1}$ at $1.06$ $\mu$. The end result of the test was a variable absorption aperture assembly which had a high transmission at the center and an attenuation of $\approx 20$ dB at the edge. The absorbing dye solvent chosen also closely index matched the window glass (windows 14 and 16) so that the assembly in toto exhibited low optical power. Such an assembly was tested with an input laser beam for a 23 mm diameter amplifier. Without an apodised aperture, made in accordance with the invention, in front of the amplifier but with a conventional aperture having the same limiting diameter, a strong set of diffraction rings could be seen in the output beam. When the apodised aperture was used to aperture the input beam, a smooth output free of rings resulted. Thus, the use of an apodised aperture in any laser system is desirable where damage from small self-focusing limits performance; e.g., for Nd glass lasers, $1.06$ $\mu$m wavelength, this occurs for intensities $\gtrsim 3 \times 10^9$ W cm$^{-2}$.

It has thus been shown that the present invention provides an apodised aperture using absorbing liquid or solid to vary transmission over the cross section which effectively minimizes deleterious diffraction effects in high power lasers.

While a particular embodiment of the invention has been illustrated and described, modifications will become apparent to those skilled in the art, and it is intended to cover in the appended claims all such modifications as come within the spirit and scope of this invention.

What we claim is:

1. An apodised aperture assembly for minimizing deleterious diffraction effects in a laser beam comprising: a support assembly having an aperture extending therethrough, a pair of window means positioned in said support assembly and in alignment with said aperture, said support assembly comprising a central section and two outer sections secured to said central section on opposite sides thereof, each of said support assembly sections being provided with a centrally located aperture having portions thereof of a cross section less than the periphery of said pair of window means, said pair of window means being substantially optically neutral and configured to define within said aperture a chamber having a thickness near zero at the center thereof and increasing thickness with increasing radius from the center thereof, one of said pair of window means comprising a lens having a convex surface, the other of said pair of window means comprising an optical element having a flat surface in abutment with said central section of said support assembly, said flat surface of said optical element being positioned closely adjacent said convex surface of said lens so as to define in cooperation with said aperture of said central section of said support assembly said radially increasing thickness chamber containing an absorbing liquid, said lens being substantially positioned in said aperture of said central section of said support assembly and retained therein by one of said two outer sections of said support assembly, said optical element being retained in abutment with said central section by the other of said outer sections, said chamber being substantially defined within said aperture of said central section of said support assembly, sealing means positioned about said chamber intermediate said window means and said support assembly comprising a first seal located intermediate said lens and said central section of said support assembly and a second seal located intermediate said optical element and said central section of said support assembly, and absorber material positioned in said chamber, said absorber material having a thickness near zero in the center and increasing in thickness with increasing radius, whereby a smoothly varying transmission profile is provided as a laser light beam passes through said aperture assembly minimizing diffraction effects.

2. The apodised aperture assembly defined in claim 1 wherein said absorber material is composed of an absorbing liquid selected from the group consisting of linear absorbing liquid, saturable absorbing liquid, and mixtures of linear and saturable absorbing liquids.

3. The apodised aperture assembly defined in claim 1, wherein said chamber is operably connected with a means for supplying said absorber material.

4. The apodised aperture assembly defined in claim 1, wherein said absorber material comprises an absorbing liquid, wherein said central section of said support assembly is provided with at least one fluid passage for interconnecting said chamber with means for supplying said absorbing liquid to said chamber.

5. The apodised aperture assembly defined in claim 1 wherein said aperture in said other of said outer sections of said support assembly is composed of a plurality of different diameter portions defining a shoulder therebetween, said optical element being retained in one of said different diameter portions of said aperture and abutting against said shoulder.

* * * * *